Dec. 16, 1924.

R. E. NEDROW

BOX CARRIER

Filed Oct. 5, 1923

1,519,160

Witnesses:

Inventor
ROY E. NEDROW.

By Richard B Owen.
Attorney

Patented Dec. 16, 1924.

1,519,160

UNITED STATES PATENT OFFICE.

ROY E. NEDROW, OF WENATCHEE, WASHINGTON.

BOX CARRIER.

Application filed October 5, 1923. Serial No. 666,781.

*To all whom it may concern:*

Be it known that I, ROY E. NEDROW, a citizen of the United States, residing at Wenatchee, in the county of Chelan and State of Washington, have invented certain new and useful Improvements in Box Carriers, of which the following is a specification.

The present invention relates to a box carrier and has for its principal object to provide a device of this nature which will be efficient in engaging a box or the like so that the same may be carried from place to place conveniently.

Another object of the invention is to generally improve upon devices of this nature by providing a carrier having a simple construction, one which is reliable, inexpensive to manufacture, durable, easy to manipulate, and well adapted for the purpose designed.

With the above and numerous other objects in view which will appear as the description proceeds, the invention resides in certain novel features of construction, and in the combination and arrangement of parts as will be hereinafter more fully described and claimed.

Figure 1:
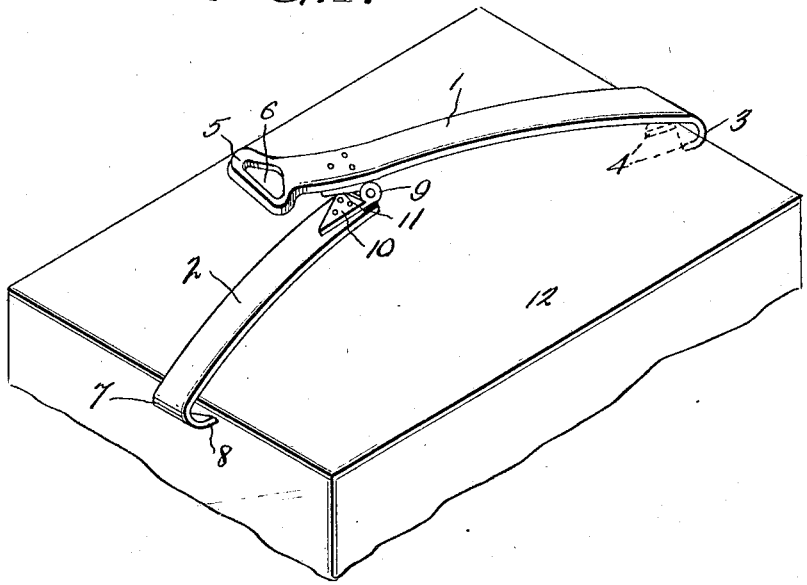
Figure 1 is a perspective view showing the carrier in an extended position.
Figure 2:
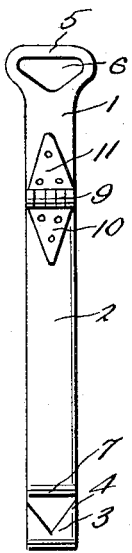
Figure 2 is an elevation thereof showing the same in a folded position.

Referring to the drawing in detail it will be seen that the carrier includes bars 1 and 2, the bar 1 being longer than the bar 2. Both bars are preferably constructed of flat metal but of course any other suitable material may be used. In the present embodiment of the invention the bar 1 terminates at one end in a hooked extension 3 which is provided with pointed terminals 4 preferably two in number but less or more may be used as desired. The other end of this bar 1 terminates in an enlargement 5 which is provided with an opening 6 thereby providing a handle. The bar 2 is constructed at one end with a hooked extension 7 terminating in a pointed prong 8 which may be multiplied as desired. A hinge 9 has one leaf 10 attached to the end of the bar 2 opposite that provided with the hook extension 7 and the other leaf 11 attached to an intermediate portion of the bar 1 adjacent the enlargement 5. It will thus be seen that the hooked extensions 3 and 7 may be disposed so that their prongs 4 and 8 engage the box 12 as shown to advantage in Figure 1 and that by grasping the handle formed by the enlargement 5 with its opening 6 the box may be lifted and carried conveniently. The heavier the box 12, the more secure and firm will be the grip of the carrier when the same is lifted by the handle. When the carrier is not in use and is lifted by the handle it will automatically take the folded position disclosed to advantage in Figure 2, and it will be noted that since the bar 2 is shorter than the bar 1 that the hooked extension 7 will be disposed above the hooked extension 3. The prong 8 being disposed adjacent the bar 1 in this folded position and the prongs 4 being disposed adjacent the hooked extension 7, it will be seen that there is practically no danger of these pointed prongs coming into engagement with foreign objects so as to injure them.

Although I have described my invention with a certain degree of particularity, it is to be understood that numerous changes in the details of construction, and in the combination and arrangement of parts may be resorted to without departing from the spirit or scope of the invention as hereinafter claimed.

What is claimed is:

1. A carrier of the class described including a long bar and a short bar, said short bar being hinged at one end to an intermediate portion of the long bar, one end of said long bar being provided with a hooked pointed extension and the other end with a handle, the free end of the short bar being provided with a hooked pointed extension, the length of said short bar being such that when it lies parallel with the long bar in a folded position its hooked extension will be disposed immediately above the hooked extension of the long bar all in the manner and for the purpose specified.

2. In a carrier of the class described, a long bar, a short bar, a hinge attached to one end of the short bar and to an intermediate portion of the long bar, said long bar having an enlargement formed at one end provided with an opening so as to form a handle, and having formed at its other end a hooked extension, said short bar formed with a hooked extension at its free end, the length of said short bar being such that when disposed substantially parallel with the long bar its hooked extension will be disposed adjacent the hooked extension of the long bar, said hooked extensions being on adjacent sides of the bars when folded.

In testimony whereof I affix my signature in presence of two witnesses.

ROY E. NEDROW.

Witnesses:
　Mrs. ANNA NEDROW,
　THOS. J. NEDROW.